(12) United States Patent
Reynar et al.

(10) Patent No.: US 10,509,817 B2
(45) Date of Patent: Dec. 17, 2019

(54) DISPLAYING SEARCH RESULTS ON A ONE OR TWO DIMENSIONAL GRAPH

(71) Applicant: Google LLC, Mountain View, CA (US)

(72) Inventors: Jeffrey C. Reynar, New York, NY (US); Michael Gordon, Brooklyn, NY (US); David J. Vespe, New York, NY (US); David Petrou, Brooklyn, NY (US); Andrew W. Hogue, Ho-Ho-Kus, NJ (US)

(73) Assignee: Google LLC, Mountain View, CA (US)

( * ) Notice: Subject to any disclaimer, the term of this patent is extended or adjusted under 35 U.S.C. 154(b) by 270 days.

(21) Appl. No.: 15/425,383

(22) Filed: Feb. 6, 2017

(65) Prior Publication Data
US 2017/0212901 A1 Jul. 27, 2017

Related U.S. Application Data

(63) Continuation of application No. 11/537,493, filed on Sep. 29, 2006, now abandoned.

(51) Int. Cl.
*G06F 16/00* (2019.01)
*G06F 16/44* (2019.01)
(Continued)

(52) U.S. Cl.
CPC .......... *G06F 16/444* (2019.01); *G06F 3/0482* (2013.01); *G06F 3/04845* (2013.01);
(Continued)

(58) Field of Classification Search
CPC ...... G06F 16/29; G06F 16/532; G06F 16/954; G06F 16/2264; G06F 16/951;
(Continued)

(56) References Cited

U.S. PATENT DOCUMENTS 5,596,500 A * 1/1997 Sprague ................. G01C 21/20
342/457
5,838,277 A * 11/1998 Loomis ................... G01S 19/14
342/357.52

(Continued)

FOREIGN PATENT DOCUMENTS

WO WO2005103624 A2 * 11/2005

OTHER PUBLICATIONS

"Information Entropy—Wikipedia, the free encyclopedia," [online] Retrieved on May 3, 2006] Retrieved from the Internet<URL:http://en.wikipedia.org/wiki/information_theory>.
(Continued)

Primary Examiner — Srirama Channavajjala
(74) Attorney, Agent, or Firm — Fish & Richardson P.C.

(57) ABSTRACT

Embodiments retrieve a set of search results that have been previously identified as having at least one associated date or location. A timeline or map is displayed that visually represents the distribution of the dates or locations within the results. The timeline is displayed with a histogram graph corresponding to the number of dates in the search results at points along the timeline. The map is displayed with markers at the locations corresponding to the locations in the search results. The user can navigate the result set using the displayed timeline or map.

18 Claims, 10 Drawing Sheets

(51) Int. Cl.
*G06F 16/29* (2019.01)
*G06F 16/951* (2019.01)
*G06F 16/22* (2019.01)
*G06F 16/955* (2019.01)
*G06F 3/0482* (2013.01)
*G06F 3/0484* (2013.01)

(52) U.S. Cl.
CPC .......... *G06F 16/2228* (2019.01); *G06F 16/29* (2019.01); *G06F 16/951* (2019.01); *G06F 16/9558* (2019.01)

(58) Field of Classification Search
CPC .... G06F 16/31; G06F 16/316; G06F 16/2228; G06F 16/9558; G01C 21/32; G08G 1/0969
See application file for complete search history.

(56) References Cited

U.S. PATENT DOCUMENTS

| | | | |
|---|---|---|---|
| 5,953,722 A * | 9/1999 | Lampert | G01C 21/26 707/E17.012 |
| 6,236,768 B1 * | 5/2001 | Rhodes | G06F 16/907 382/306 |
| 6,363,392 B1 * | 3/2002 | Halstead | G06F 16/9537 |
| 6,504,571 B1 * | 1/2003 | Narayanaswami | H04N 1/32101 348/231.99 |
| 6,691,114 B1 * | 2/2004 | Nakamura | G06F 16/29 |
| 6,772,142 B1 | 8/2004 | Kelling et al. | |
| 6,968,343 B2 | 11/2005 | Charisius et al. | |
| 7,778,952 B2 | 8/2010 | Vespe et al. | |
| 8,037,166 B2 | 10/2011 | Seefeld et al. | |
| 8,108,383 B2 | 1/2012 | Lin et al. | |
| 8,144,151 B2 | 3/2012 | Malnati et al. | |
| 8,200,676 B2 | 6/2012 | Frank | |
| 8,612,563 B2 | 12/2013 | Seefeld et al. | |
| 8,793,101 B2 * | 7/2014 | Yuen | A61B 5/6838 702/160 |
| 8,938,446 B2 | 1/2015 | Seefeld et al. | |
| 8,954,561 B2 | 2/2015 | Seefeld et al. | |
| 2002/0002439 A1 * | 1/2002 | Agnew | G01C 21/22 701/409 |
| 2002/0116336 A1 | 8/2002 | Diacakis et al. | |
| 2002/0144293 A1 | 10/2002 | Dimitrova et al. | |
| 2002/0154175 A1 | 10/2002 | Abello et al. | |
| 2003/0033296 A1 | 2/2003 | Rothmuller et al. | |
| 2003/0069893 A1 | 4/2003 | Kanai et al. | |
| 2003/0110185 A1 * | 6/2003 | Rhoads | G06F 16/29 |
| 2003/0154071 A1 | 8/2003 | Shreve | |
| 2003/0158855 A1 | 8/2003 | Farnham et al. | |
| 2003/0200192 A1 | 10/2003 | Bell et al. | |
| 2004/0107125 A1 | 6/2004 | Guheen et al. | |
| 2004/0153445 A1 | 8/2004 | Horvitz | |
| 2005/0005236 A1 * | 1/2005 | Brown | G06F 3/0485 715/246 |
| 2005/0027705 A1 * | 2/2005 | Sadri | G06F 16/29 |
| 2005/0192938 A1 | 9/2005 | Miyanohara | |
| 2005/0198076 A1 * | 9/2005 | Stata | G06F 16/316 |
| 2005/0278378 A1 * | 12/2005 | Frank | G06F 16/38 |
| 2006/0026170 A1 | 2/2006 | Kreitler et al. | |
| 2006/0031197 A1 * | 2/2006 | Oral | G06F 16/338 |
| 2006/0136127 A1 * | 6/2006 | Coch | G09B 29/10 701/468 |
| 2006/0161523 A1 | 7/2006 | Dettinger et al. | |
| 2006/0173824 A1 | 8/2006 | Bensky et al. | |
| 2007/0016651 A1 | 1/2007 | Blagdvedt et al. | |
| 2007/0100802 A1 * | 5/2007 | Celik | G06Q 10/087 |
| 2007/0124304 A1 * | 5/2007 | Dimitrova | G06F 16/583 |
| 2007/0185870 A1 | 8/2007 | Hogue et al. | |
| 2007/0218900 A1 * | 9/2007 | Abhyanker | G06Q 10/087 455/435.1 |
| 2007/0288437 A1 | 12/2007 | Xia | |
| 2008/0010605 A1 | 1/2008 | Frank | |
| 2008/0040028 A1 * | 2/2008 | Crump | G06Q 30/02 701/532 |
| 2012/0054171 A1 * | 3/2012 | Gosset | G06F 16/951 707/709 |
| 2014/0244634 A1 | 8/2014 | Duleba et al. | |
| 2015/0026144 A1 | 1/2015 | Wai et al. | |
| 2015/0161212 A1 | 6/2015 | Yang et al. | |

OTHER PUBLICATIONS

Brill, E. et al. "An Analysis of the Ask MSR Question—Answering System," Proceeding of the Conference on Empirical Methods in Natural Language Processing (EMNLP), Jul. 2002 pp. 257-264.
Brin. "Extracting Patterns and Relations from the World Wide Web," 12 pages.
Chang et al "IEPAD: Information Extraction Based on Pattern Discovery," WWW10'01, ACM, May 1-5, 2001, pp. 681-688.
Chu-Carroll et al. "A Multi-Strategy with Multi-Source Approach to Question Answering," 8 pages.
Dean et al. "MapReduce: Simplified Data Processing on Large Clusters," To appear in ISDI 2004, pp. 1-13.
Etziono et al. "Web-scale Information Extraction in KnowItAll (Preliminary Results)," WWW2004, ACM, May 17-20, 2004, 11 pages.
Freitag et al. "Boosted Wrapper Induction," American Associaten for Artifical Intelligence, 2000, 7 pages.
Guha et al. "Disambiguating People in Search," WWW2004, ACM, May 17-22, 2004, 9 pages.
Guha. "Object Co-identification on the Semantic Web," WWW2004, ACM, May 17-22, 2004, 9 pages.
Hogue. "Tree Pattern Inference and Matching for Wrapper Induction on the World Wide Web," Master of Engineering in Electrical Engineering and Computer Science, Massachusetts Institute of Technology, Jun. 2004, pp. 1-106.
Jones et al. "Bootstrapping for Text Learning Tasks," 12 pages.
Kosseim et al. "Answer Formulation for Question-Answering," 11 pages.
Liu et al. "Mining Data Records in Web Pages," Conference ,00, ACM, 2000, pp. 1-10.
Mccallum et al. "Object Consolidation by Graph Partitioning with a Conditionally-Trained Distance Metric," SIGKDD '03, ACM, Aug. 24-27, 2003 6 pages.
Mihalcea et al. "PageRank on Semantic Networks, with Application to Word Sense Disambiguation," 7 pages.
Mihalcea et al. "TextRank. Bringing Order into Texts," 8 pages.
PCT International Search Report and Written Opinion, PCT/US06/07639, dated Sep. 13, 2006, 6 pages.
PCT International Search Report and Written Opinion, PCT/US07/61157, dated Feb. 15, 2008, 11 pages.
PCT International Search Report and Written Opinion, PCT/US07/61158, dated Feb. 28, 2008, 8 pages.
Prager et al. "IBM's PIQUANT in TREC2003," 10 pages.
Prager et al. "Question Answering using Constraint Satisfaction: QA-by-Dossier-with-Constraints," 8 pages.
Ramakrishnan et al. "Is Question Answering an Acquired Skill?" WWW2004, ACM, May 17, 2004, pp. 111-120.

* cited by examiner

DISPLAYING SEARCH RESULTS ON A ONE OR TWO DIMENSIONAL GRAPH

CROSS-REFERENCE TO RELATED APPLICATION(S)

This application is a continuation of U.S. application Ser. No. 11/537,493, entitled "Displaying Search Results On A One Or Two Dimensional Graph", filed Sep. 29, 2006, the contents of which are hereby incorporated by reference in its entirety.

This application is related to U.S. application Ser. No. 11/535,843, entitled "Displaying Facts on a Linear Graph," filed Sep. 27, 2006, and U.S. application Ser. No. 11/342,277, entitled "Data Object Visualization Using Graphs," filed Jan. 27, 2006, which are hereby incorporated by reference in their entirety.

BACKGROUND OF THE INVENTION

1. Field of the Invention

This invention pertains in general to data visualization on a computer and, in particular, to ways of representing data obtained from web pages and other sources.

2. Description of the Related Art

The development of information retrieval systems has predominantly focused on improving the overall usefulness of the search results presented to the user. Information retrieval systems, or 'search engines' in the context of the Internet and World Wide Web, use a wide variety of techniques to improve the usefulness of the search results. These techniques address many aspects of search engine design, from the basic indexing methods and document representation, through query analysis and modification, to relevance ranking and result presentation, methodologies too numerous to fully catalog here.

Specifically, various methods are used to organize the results of the search for presentation to the user. Search results can be displayed in order, for example, according to a relevancy determination given the initial search parameters, in chronological order, or according to proximity to a particular geographic location. Typically, search results are a list of links to web pages where relevant information can be found. Each webpage with relevant information is typically represented once in the list of search results, regardless of the amount of information presented.

SUMMARY

Embodiments of the invention provide a method, system, a computer program product, and a user interface for displaying search results to a user.

In one embodiment, a user provides a query to the system; the query contains at least one query term. The system retrieves a set of search results comprising documents that are relevant to the query term(s), where the documents have been previously identified as having at least one associated date. The system determines the scale of a timeline to display based on the range of dates and displays the timeline with a histogram graph corresponding to the number of dates in the search results at points along the timeline. The search results can be displayed with snippets surrounding the dates, rather than on the query matches. The user can navigate the result set using the displayed timeline. For example, the user can select a section of the timeline via a user interface to expand to show a finer scale version of the histogram for that section and the results that correspond to dates in that section.

In another embodiment, the system retrieves a set of search results comprising documents that are relevant to the query terms(s), where the documents have been previously identified as having at least one associated geographic location. The search results can be displayed with snippets surrounding the geopoints, rather than on the query matches. The system determines the scale of map to display based on the geographic range of locations and displays the map with symbols at the locations corresponding to the geographic locations in the search results. The user can navigate the map via pan and zoom controls. The user can select a document to view by selecting the corresponding symbol on the map. Alternatively, the user can refine the query by selecting a symbol on the map. The system will then execute the search based on the refined query terms.

The present invention has various embodiments, including as a computer implemented process, as computer apparatuses, as integrated circuits, and as computer program products that execute on general or special purpose processors. The features and advantages described in this summary and the following detailed description are not all-inclusive. Many additional features and advantages will be apparent to one of ordinary skill in the art in view of the drawings, detailed description, and claims.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
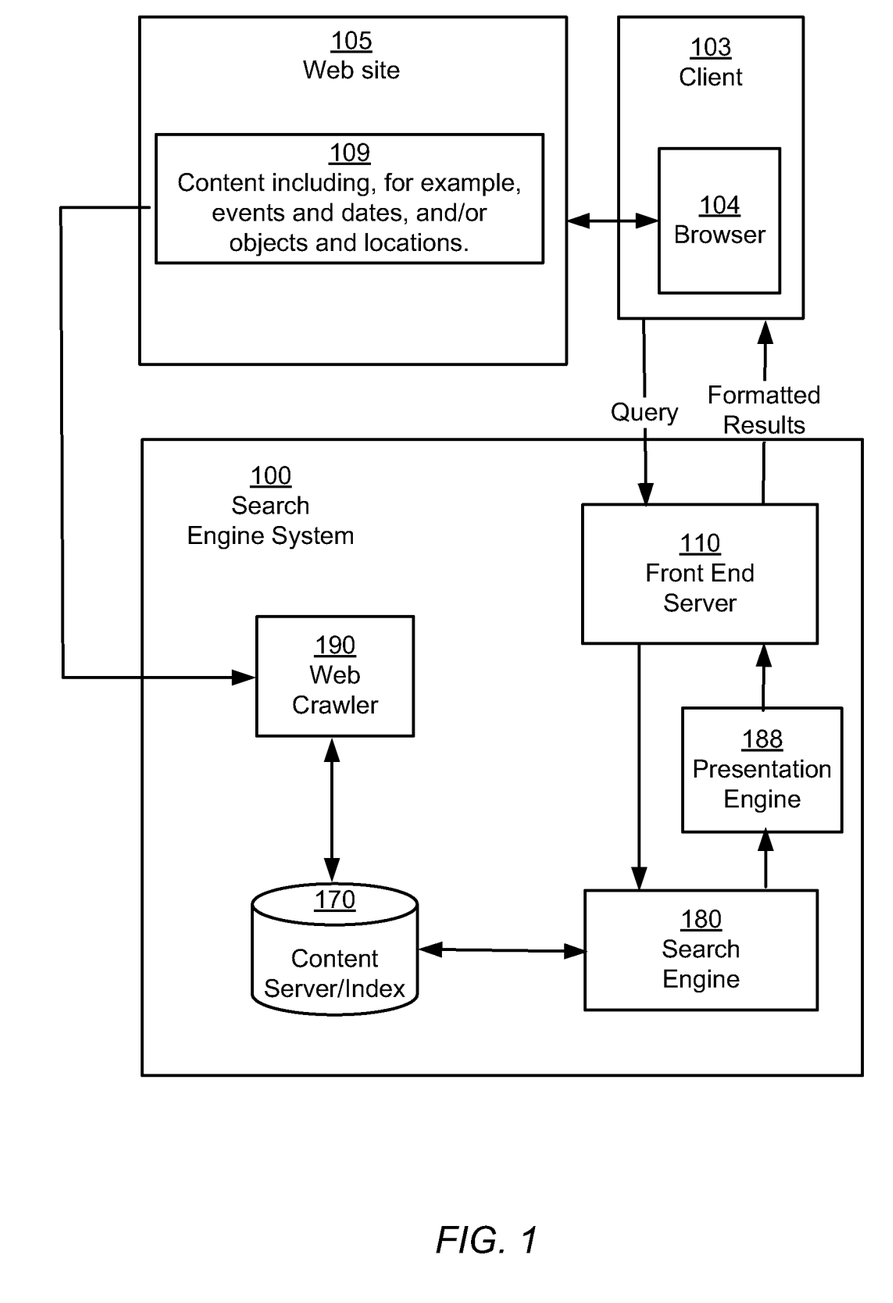
FIG. 1 illustrates a generalized system architecture for a search engine system in accordance with one embodiment.

FIG. 1 presents a diagram illustrating a system that displays search results on a one or two dimensional graph such as a timeline or a map, in accordance with an embodiment of the invention. A user operates a browser 104 located on a client 103. Client 103 can generally include any node on a network including computational capability and including a mechanism for communicating across the network. The client 103 can be any type of client, including any type of computer (e.g., desktop computer, workstation, notebook, mainframe, terminal, etc.), handheld device (personal digital assistant, cellular phone, etc.), embedded computation device, ubiquitous computation device, or the like. The client device 103 need only have the capability to communicate over a network (e.g. Internet, telephony, LAN, WAN, or combination thereof) with the search engine system 100. Typically, a client device 103 will also support appropriate networking applications and components, all of which are known to those of skill in the art.

Browser 104 can generally include any type of web browser capable of viewing a web site, such as the INTERNET EXPLORER™ browser distributed by the Microsoft Corporation of Redmond, Wash. Search engine system 100 can generally include any computational node including a mechanism for servicing queries from a client for computational and/or data storage resources. Note that the code and data involved in processing queries typically resides within a memory within search engine system 100. Copies of the code and data can also reside within non-volatile storage which is included in the system 100. The figure does not show a number of conventional components (e.g. network, firewalls, routers, domain name servers, load balancers, etc.) in order to not obscure the relevant details of the embodiment.

During operation, a user's client 103 can communicate with search engine system 100 to search for documents relevant to a query. The term "document" is used herein to refer to any and all types of content that can be accessed by a client over a network. Documents can be from any entity. An "entity" may be a specific person, group, organization, website, business, institution, government agency or the like. A query generally comprises one or more query terms. Query terms are words that the user believes are relevant to the user's information need.

Browser 104 can also access any document on the user's computer or LAN or other network such as the Internet (not shown). For example, browser 104 can access web pages, PDF documents, scanned books or articles, database contents, or any other format of documents belonging to a person, or any another type of entity such as a company, enterprise, community group, and so forth. For example, in FIG. 1 browser 104 accesses web site 105, which is hosted by a third-party server, or alternatively by the server associated with the search engine system 100. Web site 105 can generally have any type of web content 109. For example, web site 105 can include a personal home page, a blog, on-line encyclopedia pages, an e-commerce storefront for goods, and so forth. In addition, site 105 can include pages containing links to other sites (including entire sites, portions of a site, or individual pages).

In one embodiment of the present invention, a web crawler 190 obtains dates and corresponding events and/or geographical location information for objects or events 109 to facilitate subsequent usage in search results and search result ranking. The dates and geographic location information are stored in content server/index 170.

In order to obtain search results, user's client 103 sends a search query to the search engine system 100, which is received by a front end server 110. The front end server 110 is adapted to receive a query from the client 103 and pass it to the search engine 180. The search engine 180 processes the user's query using the content server and index 170 to obtain a set of search results that are relevant to the query term(s). The search engine 180 receives the search results and passes them to the presentation engine 188. The presentation engine 180 can include a user interface generation module, a map presentation module and a linear graph presentation module. The presentation engine formats the search results for display on a timeline view or a map view of the results as required and forwards the formatted results via the front end server 110 to the client 103. The front end server 110 is further adapted to handle the queries from multiple different clients 103 concurrently.

Figure 2:
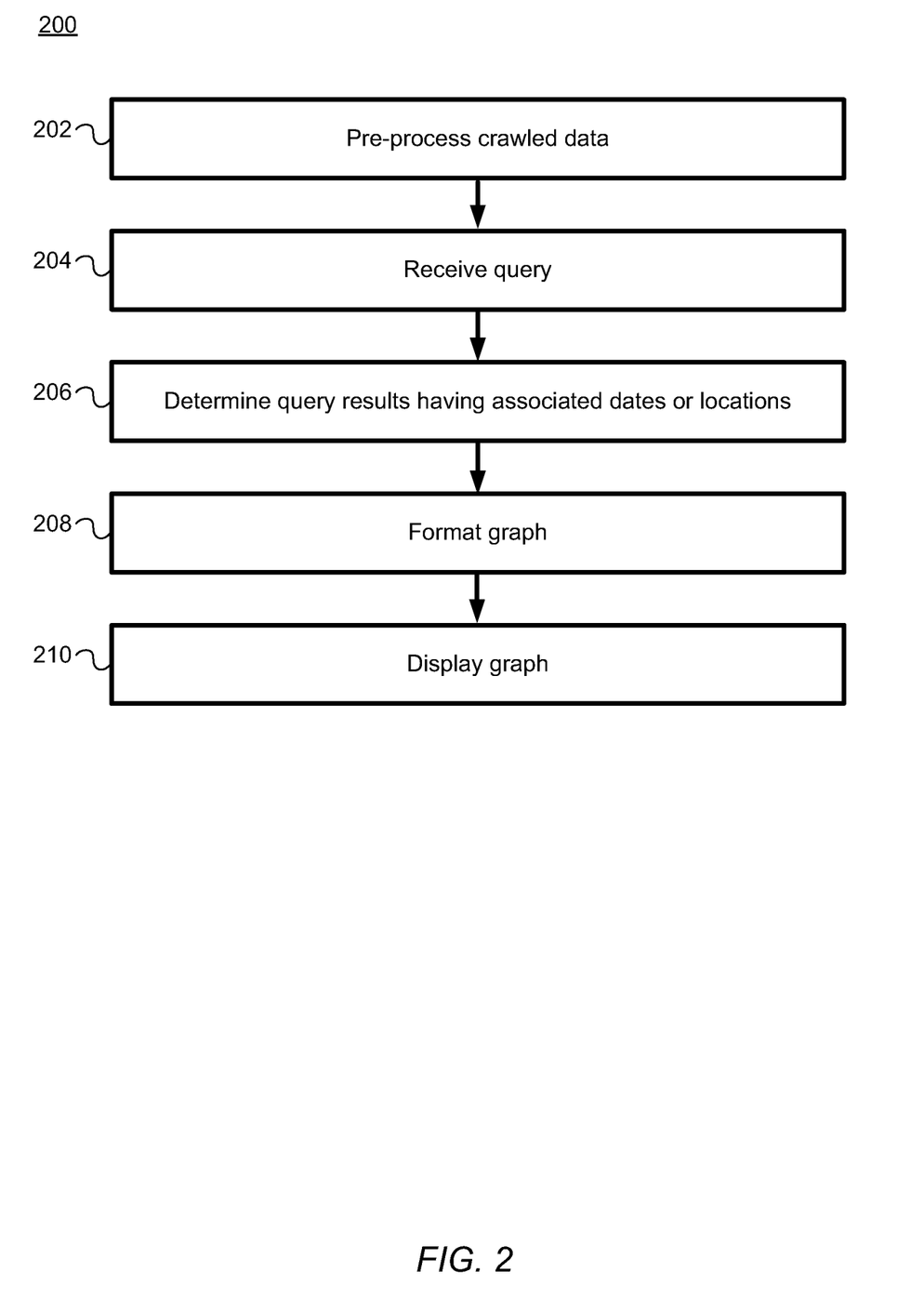
FIG. 2 is a flow chart illustrating a method of displaying a graph in accordance with one embodiment.

FIG. 2 is a flow chart illustrating a method 200 of displaying a graph in accordance with one embodiment of the invention. In step 202, the crawled data is pre-processed by the web crawler 190 or another module that can identify dates and geographic locations or geopoints from web content. For example, from the sentence "John F. Kennedy was born May 29, 1917 in Brookline, Mass.," a date can be extracted (year=1917, month=5, day=29) and a location can be extracted (latitude=42.332, longitude=71.122). These dates or locations or geopoints are stored in the index 170 along with the entry or entries for the document in which they are contained. Note that in one embodiment, a plurality of dates or locations may be included in one document. Thus, one entry for a document in the index 170 may include a plurality of dates and or locations. For example, an article about the life of JFK may mention the date of his birth, the date of his inauguration, various dates marking events during his administration, and the date of his assassination. An entry for this example article in the index 170 may comprise all of these dates. In one embodiment, the character offsets in the document for the dates and locations are stored. Then, the text around the offsets is used to create the snippets displayed with the result. Note that the dates or locations associated with a document can be extracted from the content of the document, not merely from metadata about the document. In one embodiment, dates and locations can be extracted from the content of the document and from metadata.

In step 204, a query is received by the search engine system 100. The query can be formatted according to any method known in the art. For example, the query may comprise a keyword, a text string, several terms separated by Boolean operators, or the like. In one embodiment, the user sending a query indicates that he would like the results formatted in a special way (for example, by dates or geographic locations). In another embodiment, the user does not make such an indication until after an initial query results set is displayed.

In step 206, the query results having associated dates or locations are determined. In processing the query, the search engine 180 identifies relevant documents using the content server and index 170. For each relevant document, the search engine 180 identifies which documents have associated dates or locations. For example, the document may mention dates or locations, or for example, dates or locations can be extracted from HTML anchors that point to the document. In one embodiment, this was determined in element 202. In one embodiment, only results that have associated dates or locations will be returned. In another embodiment, all relevant results are returned, regardless of whether the results have associated dates or locations.

In step 208, the presentation engine 188 formats the graph of the data. In one embodiment, the presentation engine 188 determines the scale of the graph along the time dimension. For example, if the dates within the search results occur exclusively within one decade or one year, the presentation engine 188 can format the results for display on a timeline that includes just that decade or year, respectively. In one embodiment, the time range to display is selected to be sufficiently large to encompass all dates within the results, and a scale is selected such that the entire time range can be displayed in a window of the user interface without panning or scrolling. In one implementation, the initial time range to display is chosen with less weight given to recent dates because they are so prevalent on the web. For example, if there are ten dates in the 1960's and five dates in the 2000's, the timeline may be presented as a view of just the 1960's, because the recent dates may be less relevant. In another embodiment, a default time frame and/or time scale is used. Similarly, presentation engine 188 can determine the scale of the vertical axis of the histogram of results along the timeline. In one implementation, a maximum length of a bar in the bar chart is selected to correspond with a certain number of results within one time period "bin", and all other bars are normalized according to this standard. For example, if 10 results is set to correspond to the maximum bar length, then a "bin" with 20 results would have a bar of the same maximum length, and a "bin" with 5 results would have a bar that is half as long. In another implementation, the highest number of results in a bin is used as the maximum bar length, and all others are normalized against this standard. Many other methods to determine a scale are also possible. In another embodiment, the presentation engine 188 formats a map with the locations corresponding to search results. The presentation engine 188 may be configured to select a map scale that enables all results to be displayed on the map. Alternatively, the presentation engine 188 may be configured to select a map scale that enables a subset of the results, for example the first twenty ranked results, or a majority of the first 100 ranked results to be displayed. More details about other format options are described below with reference to the user interface figures.

In step 210, the graph of the data is displayed. The formatted results are sent from the search engine system 100 to the client 103, and displayed. Examples of displayed results in timeline format and map format are shown in the following figures.

Figure 3A:
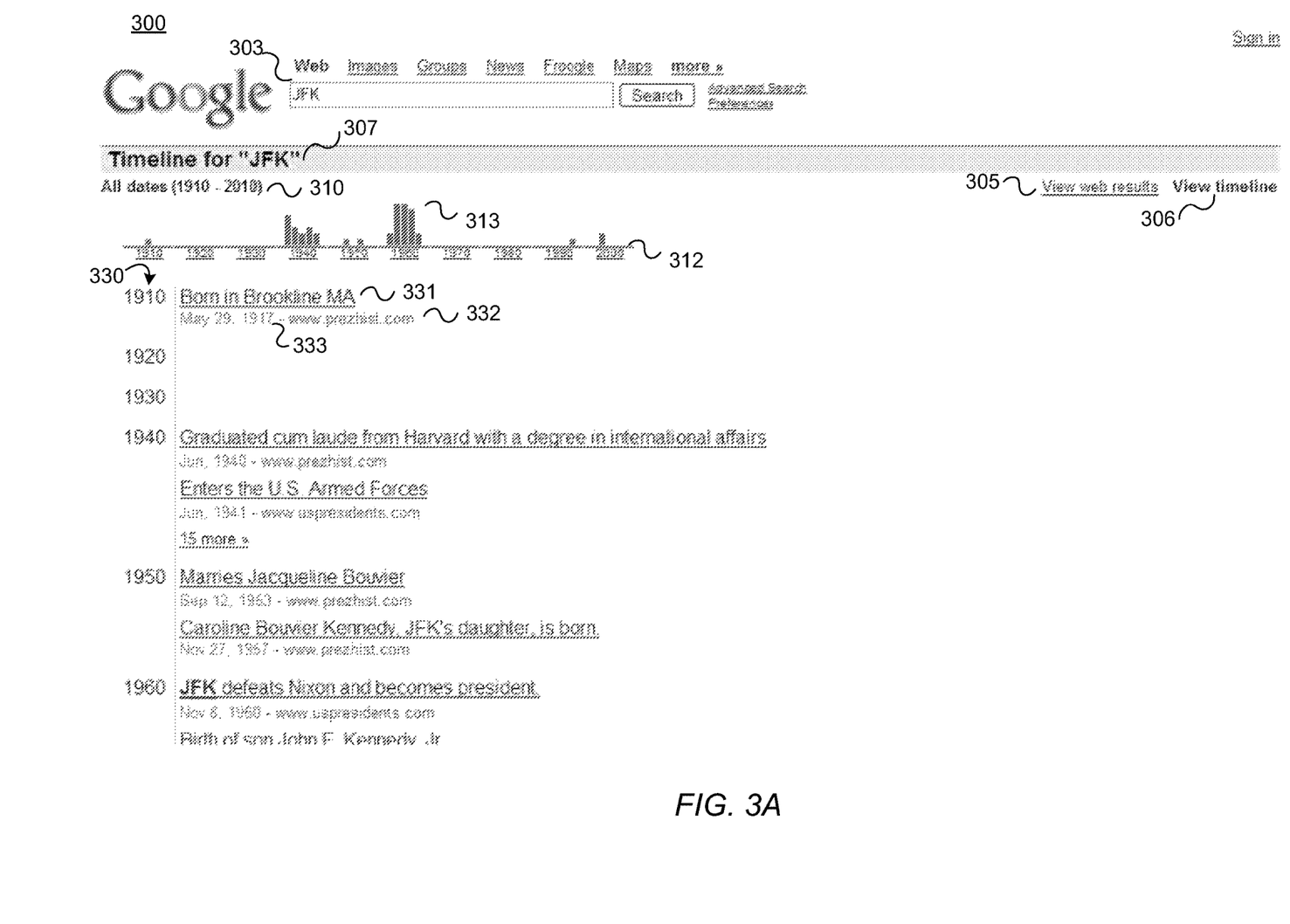
FIG. 3A is an illustration of an example user interface for navigating search results represented on a timeline in accordance with one embodiment.

FIG. 3A is an illustration of an example user interface 300 for navigating search results represented on a timeline in accordance with one embodiment. In this example, the user interface 300 includes a search interface 303, where a query "JFK" 303 has been entered. The user has the option of viewing the web results by selecting the "View web results" option 305, or viewing the timeline by selecting the "View timeline" option 306. In one embodiment, the timeline option is the default for the display of results. Regardless of which view of the results is displayed first, in this embodiment, the user has the option to toggle between viewing the web results and viewing the timeline by selecting option 305 or option 306 respectively. In one implementation, the web results are displayed in ranked order by relevance as it is known in the art rather than in chronological order.

In the example of FIG. 3A, a title 307 appears above the date range 310 and the timeline 312 itself. In one implementation, the title 307 includes the search terms used. The date range 310 indicates the time period of the timeline 312. The timeline 312 includes a histogram of the search results that fall within the date range 310 of the timeline 312. In the example shown in FIG. 3A, the timeline 312 provides a visualization of the distribution of the dates represented in the results set; there is a cluster of results having dates in the 1940's and a cluster of results have dates in the 1960's, with a few other dates spread throughout the century. In one embodiment, the histogram is only representative of the dates within the highest ranking results, for example twenty or 100 highest ranking results. In another embodiment, the histogram is representative of the distribution of dates relevant to the search terms for the entire set of results.

In the example of FIG. 3A, the user interface 300 also includes a list of the results 330 presented chronologically and divided according to the unit of measure of the timeline 312. In this example, the list of results 330 is divided by decade. For each result in the list, the event 331 can be listed along with the date the event occurred 332 and a link 333 to the web site or a URL where the document with this information can be found. The user can select the link 333 to access the document. In one embodiment, the results list 330 can include a plurality of references to the same web site. For example, several of the results in FIG. 3A reference the same web site, "www.prezhist.com." Whereas conventional web results may prevent duplicate references to a document, the timeline web results can be designed to display the unique dates from all web results, and may present multiple dates from one source document. In one embodiment, all dates from all web results are displayed, regardless if a date is duplicated. In another embodiment, only the highest ranked result for any date is displayed. In yet another embodiment, the number of duplicates of dates permitted depends on the time period selected. As is described below, the user interface 300 can provide the user the ability to "drill down" within a particular section of the timeline to obtain more detail on the results within that section. Therefore, in one embodiment, no duplicates are displayed when all dates are displayed, but as the user drills down within a narrower and narrower time window, duplicates may be displayed.

Figure 3B:
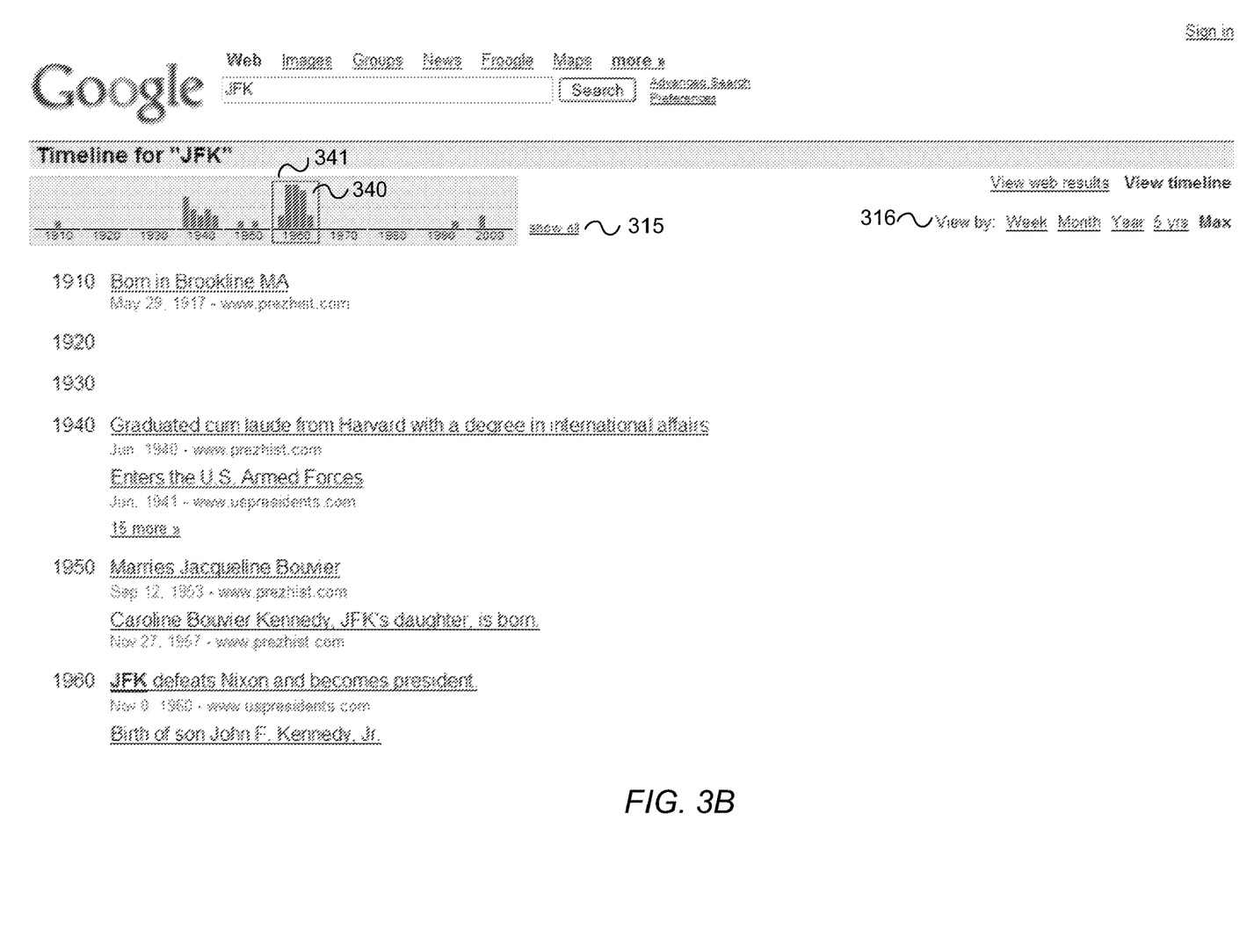
FIG. 3B is an illustration of another example of a user interface for navigating search results presented on a timeline in accordance with one embodiment.

FIG. 3B is an illustration of another example of a user interface for navigating search results presented on a timeline in accordance with one embodiment. In this example, options 316 for viewing the results by week, month, year, 5 years, or max are presented. The user can select an option for the detail with which to view the histogram of results along the timeline 312 and the corresponding list of results 330. In this example, the default max time period is by decade. If the user selects to view the results by a smaller unit, such weeks, months, hours, minutes, seconds, etc., the user can select the "show all" option 315 to quickly navigate back to viewing the entire timeline. The user can select a portion of the timeline to view in more or less detail as desired.

In the example shown in FIG. 3B, the user is preparing to select the decade corresponding to the 1960's 340. In one embodiment, the user can position the cursor over the time period of interest, for example, using a mouse or other pointing device, and click or otherwise select it. In one embodiment, the user's selection of a time period of interest appears as a box 341 around a portion of the timeline. In one embodiment, a single click on, for example, the 1960's 340 will cause the results for the 1960's to appear first in the results list below, as if the user had scrolled down to them. In this way, the user can interact with the timeline to navigate the list of results. In another embodiment, a user can double click on a portion of the timeline, for example one decade, to expand the timeline such that the timeline includes only the selected date range and the results list 330 includes only results within the same time frame. In another embodiment, the user can click and drag to highlight a section of the timeline of interest. In one implementation, the highlighted section of the timeline is expanded and the corresponding results are listed in the result list 330 below.

Figure 4:
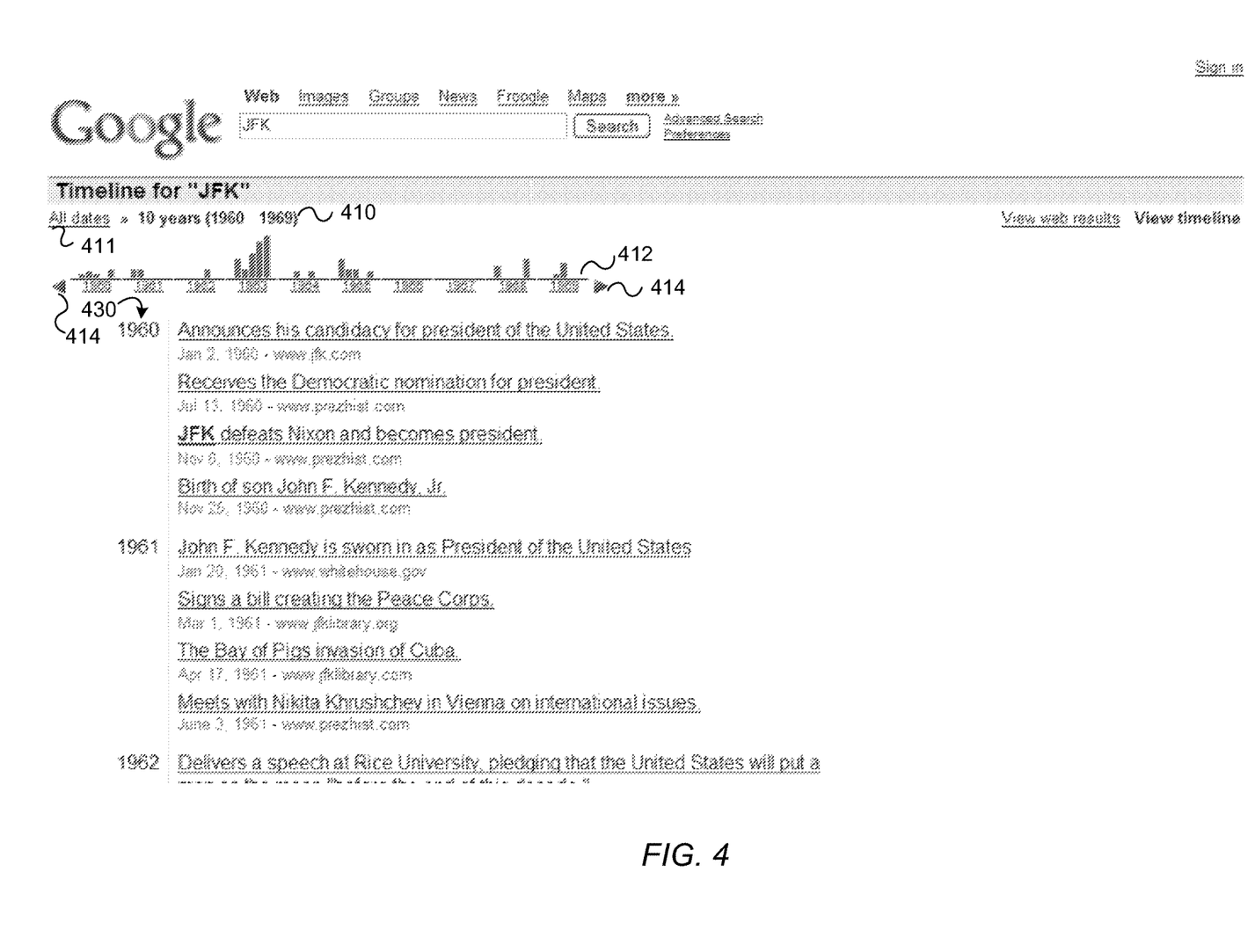
FIG. 4 is an illustration of a user interface for navigating search results represented on a timeline, the timeline displaying a decade date range, in accordance with one embodiment.

FIG. 4 is an illustration of a user interface for navigating search results represented on a timeline 412, the timeline 412 displaying a decade date range 410, in accordance with one embodiment. The user may see this screen after having selected the 1960's from the timeline shown in FIG. 3B. If the user wants to return to viewing all results, such as shown in FIG. 3B, the user can select the "All dates" option 411. The user interface also provides the option of viewing the portion of the timeline and associated results to the left or right of the displayed portion of the timeline by selecting the left or right arrows 414. This causes the timeline to scroll to the left or right respectively and the results listed in result list 430 to correspondingly change to those represented on the currently visible portion of the timeline. As described above with reference to FIG. 3B, again, the user can select a portion of the timeline to expand to view in more detail and view results having dates corresponding to that portion of the timeline.

Figure 5:
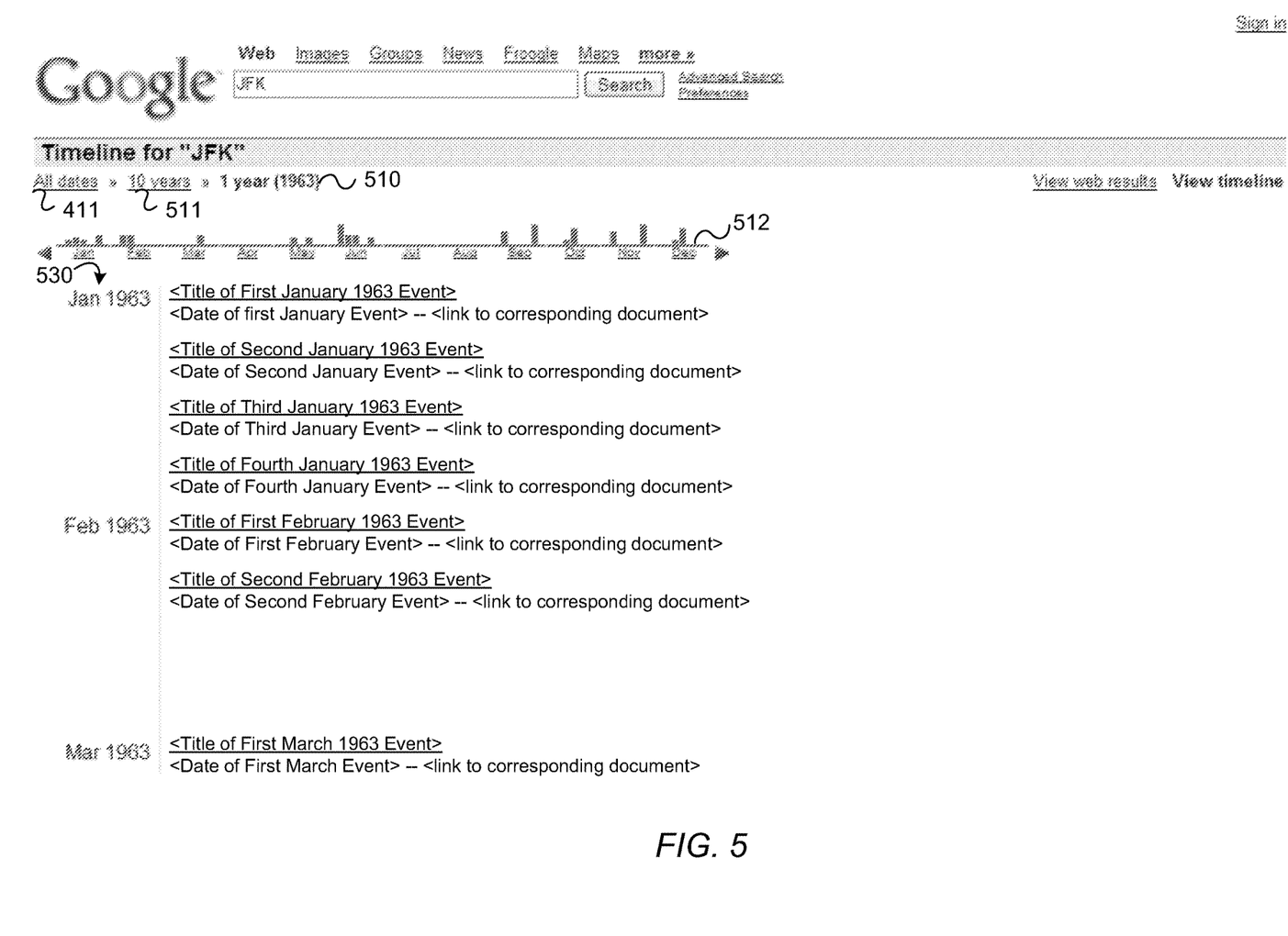
FIG. 5 is an illustration of a user interface for navigating search results represented on a timeline, the timeline displaying a one year date range, in accordance with one embodiment.

FIG. 5 is a generalized illustration of a user interface for navigating search results represented on a timeline 512, the timeline displaying a one year date range 510, in accordance with one embodiment. The user may navigate to this screen with a one year date range by selecting, for example, the year 1963 from the timeline 412 in FIG. 4. If the user wants to return to viewing results from the full decade of the 1960's, the user can select option 511. If the user wants to view results from all dates, the user can select the "All dates" option 411. The results list 530 has been generalized to demonstrate one example format for the display of the results. In this implementation, results are listed chronologically, and divided by month. In one embodiment, a maximum number of results are displayed for each time period in the results list 530. In this example, a maximum of four results are listed for each month. As discussed above, if more than four results are available in any one month, a determination is made as to which results to display. The four results with the earliest dates may be shown, or the four highest ranked results may be shown, or four results that are evenly spread throughout the time period might be shown, depending on the application. In one embodiment, to obtain more results for one month, the user can select the corresponding month from the timeline 512 to expand the timeline to include just dates within the month.

In the previous examples, a timeline of a century, a decade, and a year have been shown. It is also possible that the timeline be longer, for example several centuries or more, or shorter, for example a week, a day, hour, minute, second, or shorter, without departing from the principles of the invention. For example, in one embodiment, dates falling within a month or less may be displayed in a calendar format. The distribution of the dates within the month can be represented by the length of a bar or the number of symbols within each box signifying a day of the month. Alternatively or additionally, a color scheme or color scale can be used to represent the distribution of the dates within the month, or within a longer timeline.

Figure 8:
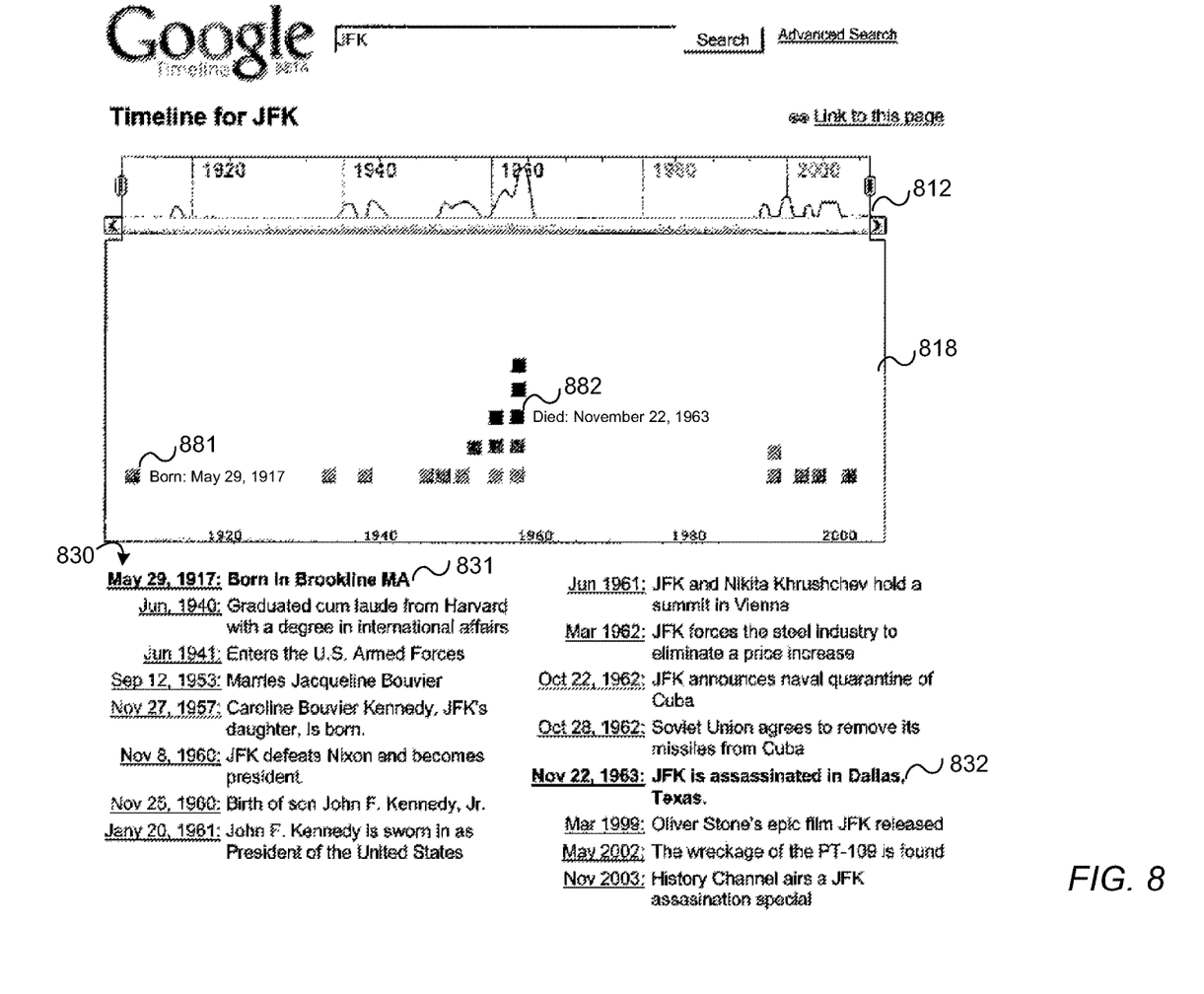
FIG. 8 is an illustration of yet another example user interface for navigating search results presented on a timeline in accordance with one embodiment.

FIG. 8 is an illustration of yet another example of a user interface for navigating search results presented on a timeline in accordance with one embodiment. In this example, the timeline 812 with a line graph histogram appears above a distribution 818 of block markers corresponding to search results, such as marker 881 and 882. The block markers in distribution 818 correspond to search results presented in the list 830. In this example, each result, such as result 831 and 832 comprises a date and a description of an event that occurred on the date. In one embodiment, certain important dates and events are presented in bold, or otherwise highlighted or made distinguishable from other dates and events. For example, dates that occur with the highest frequency in the results can be emphasized. In this example, the birth date 831 and death date 832 are presented in bold. Also in this example, the markers corresponding to the birth date 881 and death date 882 in distribution 818 are labeled. In one embodiment, the user can select one of the search results 830, for example by clicking on the date or the description, to access the document from which the information was extracted.

Figure 6:
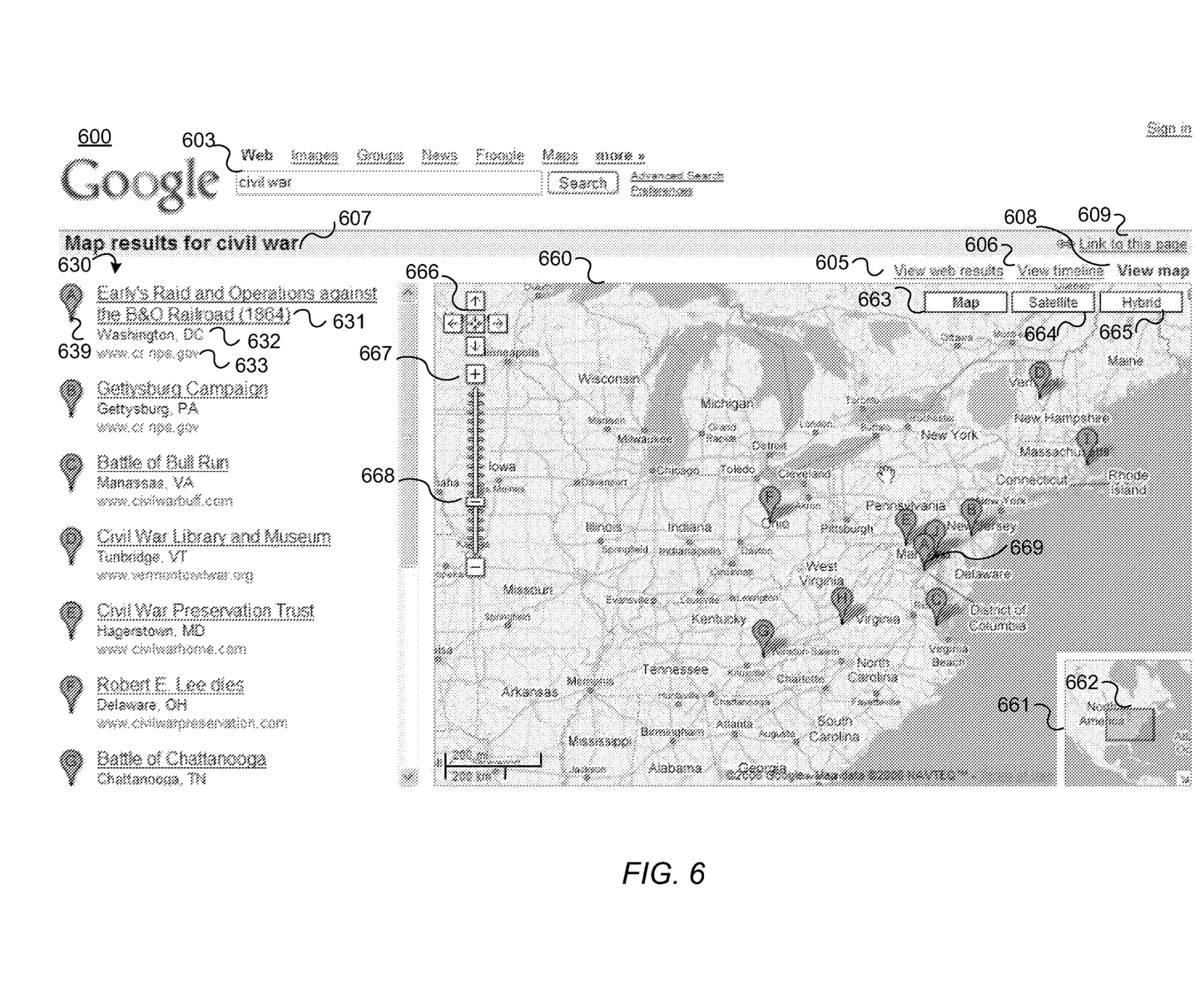
FIG. 6 is an illustration of a user interface for navigating search results presented on a geographical map in accordance with one embodiment.

Referring now to FIG. 6, there is shown an illustration of a user interface 600 for navigating search results 630 presented on a geographical map 660 in accordance with one embodiment. In this example, the user interface 600 includes a search interface 603, where a search for "civil war" has been entered. The user can enter non-geographical search terms, i.e., search terms that do not explicitly specify a unique location or place such as "civil war", "state capitols", or "Marilyn Monroe", and view the locations extracted from the search results on a map. The user has the option of viewing the web results by selecting the "View web results" option 605, or viewing a timeline by selecting the "View timeline" option 306, or viewing a map by selecting the "View map" option 608. In one embodiment, the map option is the default for the display of results. Regardless of which view of the results is displayed first, the user has the option to toggle between a viewing the web results, the timeline, and the map by selecting option 605, 606, or 608 respectively. In one implementation, the order of displayed results and/or the result set may be different depending what option 605, 606, or 608 is selected. In one embodiment, the timeline view and the map view of results is visible to the user on the same page. For example, a user may enter a query for "Rolling Stones Concerts" and be able to view the locations of concerts on a map and the dates of concerts on a timeline, and be able to link to any of the documents from which the dates and locations were extracted, all from a single page.

In one embodiment, the user interface 600 also includes an option 609 to "Link to this page." The user can select this option or button to generate a hyperlink to place on an external web page that links to the current page with the current view of the search results and graphical presentation of them.

In the example of FIG. 6, a title 607 appears above the list of results 630 and the map 660. In one implementation, the title 607 includes the search terms used. Below the title, a list of results 630 are displayed in ranked order. For each result in the list, the event or object title 631 can be listed along with the geographic location 632 and a link 633 to the web site where the document with this information can be found. Each result in the result list 630 has a corresponding marker 639, which is placed at the respective location 669 on the map 660 referenced in the result. In one embodiment, each marker is distinctive. In this example, the markers resemble push pins with letters on them; alternatively, they can be any shape, symbol, and color with any identifying feature that distinguishes them from each other. For example, the markers can be different colors from one another, be different shapes, have different numbers or words, or have any other distinguishing characteristic or combination of distinguishing characteristics. In one embodiment, certain important locations or the markers at those locations are presented in bold, or otherwise highlighted or made distinguishable from other locations or markers. For example, locations that occur with the highest frequency in the results can be emphasized.

In one embodiment, the results list 630 can include a plurality of references to the same web site. For example, several of the results in FIG. 6 reference the same web site, "www.cr.nps.gov." As discussed above, whereas conventional web results may prevent duplicate references to a document, the map 660 of results can be designed to display the unique locations from all web results, and may present multiple locations from one source document. In one embodiment, all locations from all results 630 are displayed and mapped, regardless if a location is duplicated. In other embodiments, only the highest ranked or the most frequent result for any location is displayed. In yet another embodiment, the amount of duplicates of locations permitted depends on the scale of the map. As is described below, the user interface 600 can provide the user the ability to zoom within a particular section of the map to obtain more detail on the results within that section. Therefore, in one embodiment, no duplicates are displayed when large area is mapped, but as the user zooms within a narrower area, duplicates may be displayed.

The map 660 provides a visualization of the distribution of the geographic locations referenced in the result set. In this example, there is a cluster of locations in New England, with a few other locations spread to the north and south. In one embodiment, the map is only representative of the locations within the highest ranking results, for example twenty or 100 highest ranking results. In another embodiment, the map is representative of the distribution of locations relevant to the search terms for the entire set of results. The map 660 includes a smaller inset map 661 to orient the user. The outlined area 662 within the inset map 661 is representative of the location of the area within map 660 relative to larger landmarks, such as North America. The user also has the option of displaying the map 660 as a map as shown in FIG. 6 by selecting button 663, or displaying the map 660 using satellite photograph data (not shown) by selecting button 664, or displaying the map 660 using a hybrid (not shown) of traditional map symbols and satellite photograph data by selecting button 665.

A user can navigate the map 660 using pan control 666, and the zoom control 667. To view sections of the map to the north, south, east, or west, the user can press the corresponding arrow of the pan control 666. Alternatively, the user can click on the map 660 and drag the map in any direction. To zoom in on a section of the map, the user can select the plus button of the zoom control 667 or alternatively, drag the slider 668 of the zoom control up, or click along the line above the slider 668. In order to zoom out, the user can select the minus button of the zoom control 667 or alternatively, drag the slider 668 of the zoom control down, or click along the line below the slider 668.

In one embodiment, a user can click on mapped marker, such as marker 669, to select the corresponding document from result list 630 to view. In one embodiment, when the user hovers a cursor over a marker, a pop-up bubble appears that displays the corresponding result from the list of results 630. In another embodiment, a single click or a double click by the user causes a popup bubble to appear.

Figure 7:
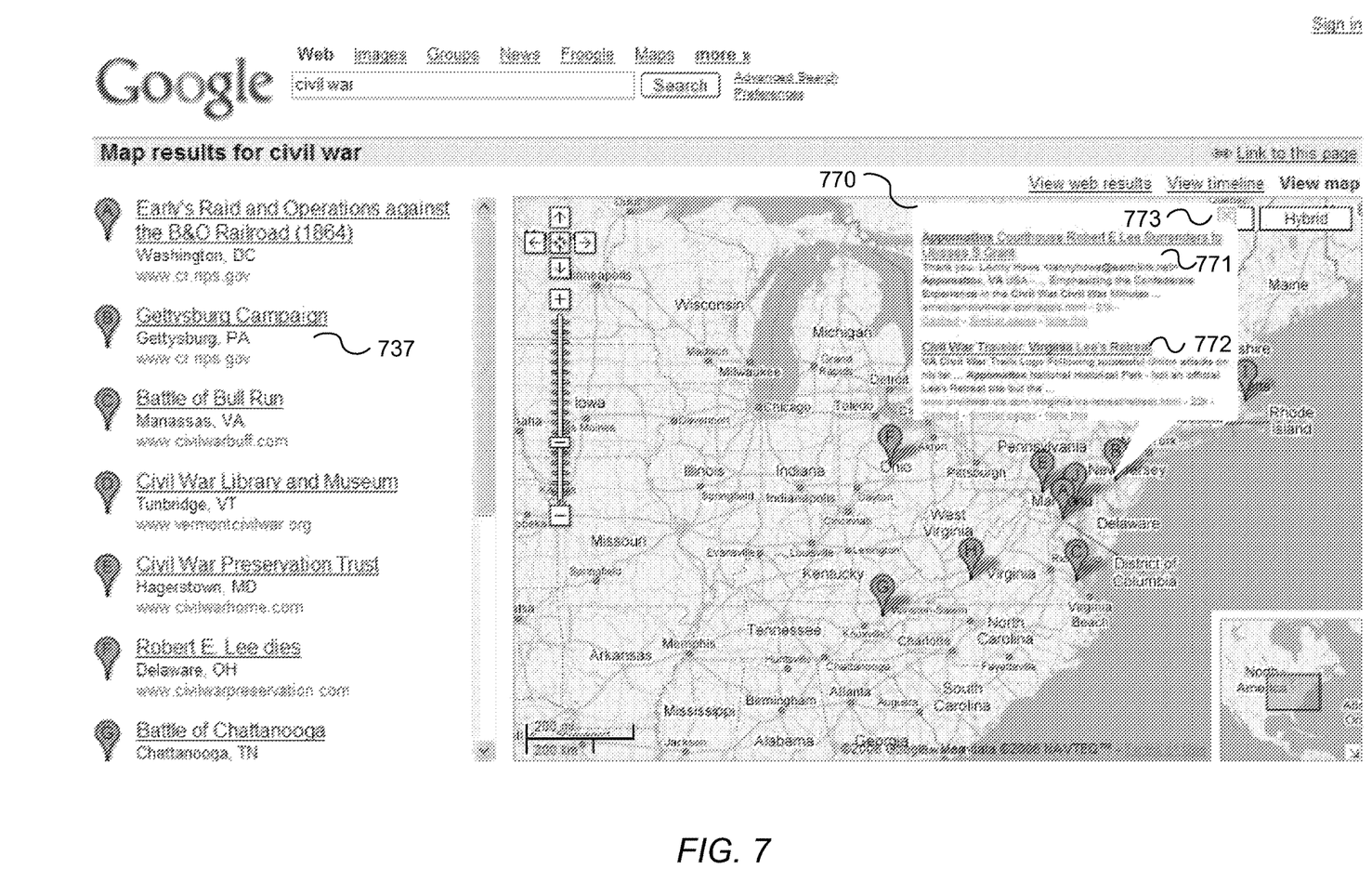
FIG. 7 is an illustration of a user interface for navigating search results presented on a geographical map with a pop up bubble displaying search results from a refined search.

FIG. 7 shows an example of a pop-up bubble 770 corresponding to marker B that marks the location of the "Gettysburg Campaign" result 737 from the results list. In this embodiment, the user can execute a refined search by clicking on a marker on the map 660. In this example, the user first searched for "civil war". However, after seeing the mapped results and the results list, the user desired more information related to one of the search results, in this case, search result 737. Rather than entering a new search query, the user can click or otherwise select the marker at the location of the result of interest to add terms to the search query and execute the refined query. In one embodiment, the terms added are from the name of the object or location or event that occurred at the location marked on the map (e.g., a search for [civil war battle of Gettysburg]). In another embodiment, the location is added as a search term (e.g., a search for [civil war Gettysburg, Pa.]). The results 771, 772 from the refined search appear in the bubble 770. In one embodiment, only a few of the top ranked results appear in the bubble, however, any number of results can be displayed. The user can select one of the search results 771, 772 to view the corresponding document or can close the bubble by selecting button 773.

Figure 9:
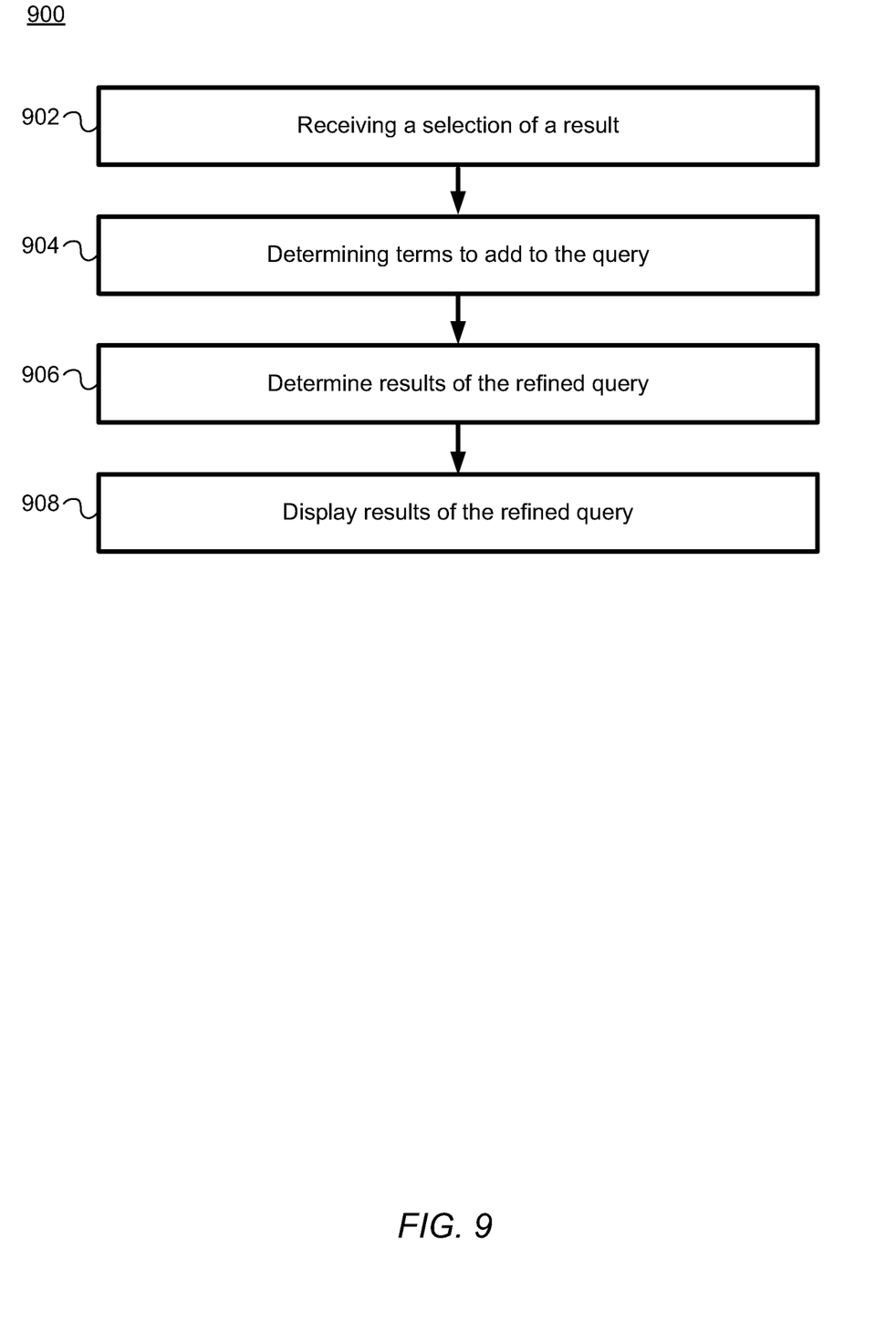
FIG. 9 is a flow chart illustrating a method of displaying refined search results in accordance with one embodiment.

FIG. 9 is a flow chart illustrating a method 900 of displaying refined search results in accordance with one embodiment. In step 902, a selection of a result is received from the user, for example by the user clicking on the result, on the text of the result in the results list 630, or on the marker corresponding to the result on the map 660. In step 904, the terms to add to the query are determined. For example, the name of the location that was extracted from the document represented by the selected result can be added as a term in the refined query. In step 906, the results of the refined query are determined. In one embodiment, the refined query is sent to the search engine asynchronously, for example using AJAX. Then, in step 908, the results of the refined query are displayed to the user.

The above description is included to illustrate the operation of the embodiments and is not meant to limit the scope of the invention. From the above discussion, many variations will be apparent to one skilled in the relevant art that would yet be encompassed by the spirit and scope of the invention. Furthermore, several figures are presented as screen shots depicting examples of the user interface as it might appear on a display screen or other output device. The particular screen layouts, appearance, and terminology as depicted and described herein, are intended to be illustrative and exemplary, and in no way limit the scope of the invention as claimed.

Those of skill in the art will also appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    storing, by one or more server computers, an index that includes a plurality of index entries for respective documents, each index entry including data that includes a geographic location that was extracted from a document on which the index entry is based;
    receiving, by the one or more server computers, a search request from a user device that (i) includes at least one keyword and (ii) does not include any geographical information;
    generating, by the one or more server computers, a listing of index entries corresponding to one or more indexed documents, based on the search request, including only index documents (i) that are responsive to the search request and (ii) include a geographic location;
    providing, by the one or more server computers for output in a user interface of the user device, a results page including at least a subset of the listing of index entries that includes an identification of individual indexed documents; and
    generating, by the one or more server computers for output in the user interface of the user device and on the results page,
    (i) map using the geographic location for each of the individual indexed documents in the at least a subset of the listing of index entries, wherein (a) the map includes a position marker for each of the individual indexed documents, (b) each individual indexed document and the position marker associated with that indexed document are linked for user selection, and (c) the positions markers for a first set of documents in the individual indexed documents are visually distinguishable from the position markers for a second set of documents in the individual indexed documents; and
    (ii) a timeline using dates extracted from each of the individual indexed documents in the at least a subset of the listing of index entries, wherein (a) the date associated with each individual indexed document is linked for user selection and (b) the timeline includes dates for each of the individual indexed documents included on the map.

2. The computer-implemented method of claim 1, wherein the geographic location was extracted from the content of at least one document.

3. The computer-implemented method of claim 1, wherein the geographic location was extracted from the metadata of at least one document.

4. The computer-implemented method of claim 1, the method further comprising:
    determining that at least one particular indexed document associated with the subset of listing includes multiple geographic locations; and
    providing, by the one or more server computers for output in the user interface of the user device at least a subset of the listing that includes an identification of the particular document and data for generating a map using each of the multiple geographic locations included in the particular document.

5. The computer-implemented method of claim 1, the method further comprising:
    determining that at least one particular indexed document associated with the subset of listing includes multiple geographic locations;
    determining a ranking score for each geographic location of the plurality of geographic locations;

selecting a subset of the one or more geographic locations of the multiple geographic locations based on the ranking score; and providing, by the one or more server computers for output in the user interface of the user device at least a subset of the listing that includes an identification of the particular document and data for generating a map using the subset of the one or more geographic locations selected based on the ranking score.

6. The computer-implemented method of claim 1, wherein the subset of the one or more documents that are responsive to the search request includes a set of the top n-highest ranked documents.

7. The computer-implemented method of claim 1, wherein the search result document includes one or more buttons for modifying the displayed map.

8. The computer-implemented method of claim 7, the method further comprising:

receiving a selection of a first button of the one or more buttons; and in response to the selection of the first button, modifying the displayed map to include a satellite photograph of a geographic region represented by the map.

9. The computer-implemented method of claim 7, the method further comprising:

receiving a selection of a second button of the one or more buttons; and in response to the selection of the second button of the one or more buttons, modifying the displayed map to include traditional map symbols.

10. A system comprising:

one or more computers and one or more storage devices storing instructions that are operable, when executed by the one or more computers, to cause the one or more computers to perform operations comprising:

storing, by one or more server computers, an index that includes a plurality of index entries for respective documents, each index entry including data that includes a geographic location that was extracted from a document on which the index entry is based;

receiving, by the one or more server computers, a search request from a user device that (i) includes at least one keyword and (ii) does not include a parameter that explicitly identifies a geographic location;

providing, by the one or more server computers for output in a user interface of the user device, a results page including at least a subset of the listing of index entries that includes an identification of individual indexed documents; and generating, by the one or more server computers for output in the user interface of the user device and on the results page, (i) a map using the geographic location for each of the individual indexed documents in the at least a subset of the listing of index entries, wherein (a) the map includes a position marker for each of the individual indexed documents, (b) each individual indexed document and the position marker associated with that indexed document are linked for user selection, and (c) the positions markers for a first set of documents in the individual indexed documents are visually distinguishable from the position markers for a second set of documents in the individual indexed documents; and (ii) a timeline using dates extracted from each of the individual indexed documents in the at least a subset of the listing of index entries, wherein (a) the date associated with each individual indexed document is linked for user selection and (b) the timeline includes dates for each of the individual indexed documents included on the map.

11. The system of claim 10, wherein the geographic location was extracted the content of at least one document.

12. The system of claim 10, wherein the geographic location was extracted from the metadata of at least one document.

13. The system of claim 10, the operations further comprising:

determining that at least one particular indexed document associated with the subset of listing includes multiple geographic locations; and providing, by the one or more server computers for output in the user interface of the user device at least a subset of the listing that includes an identification of the particular document and data for generating a map using each of the multiple geographic locations included in the particular document.

14. The system of claim 10, the operations further comprising:

determining that at least one particular indexed document associated with the subset of listing includes multiple geographic locations;

determining a ranking score for each geographic location of the plurality of geographic locations;

selecting a subset of the one or more geographic locations of the multiple geographic locations based on the ranking score; and providing, by the one or more server computers for output in the user interface of the user device at least a subset of the listing that includes an identification of the particular document and data for generating a map using the subset of the one or more geographic locations selected based on the ranking score.

15. The system of claim 10, wherein the subset of the one or more documents that are responsive to the search request includes a set of the top n-highest ranked documents.

16. The system of claim 10, wherein the search result document includes one or more buttons for modifying the displayed map.

17. The system of claim 16, the operations further comprising:

receiving a selection of a first button of the one or more buttons; and in response to the selection of the first button, modifying the displayed map to include a satellite photograph of a geographic region represented by the map.

18. The system of claim 16, the operations further comprising:

receiving a selection of a second button of the one or more buttons; and in response to the selection of the second button of the one or more buttons, modifying the displayed map to include traditional map symbols.

* * * * *

UNITED STATES PATENT AND TRADEMARK OFFICE
CERTIFICATE OF CORRECTION

| | |
|---|---|
| PATENT NO. | : 10,509,817 B2 |
| APPLICATION NO. | : 15/425383 |
| DATED | : December 17, 2019 |
| INVENTOR(S) | : Reynar et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 320 days.

Signed and Sealed this
Tenth Day of January, 2023

Katherine Kelly Vidal
*Director of the United States Patent and Trademark Office*